US009502934B2

(12) United States Patent
Huang et al.

(10) Patent No.: US 9,502,934 B2
(45) Date of Patent: Nov. 22, 2016

(54) MOTOR ROTOR AND MOTOR HAVING SAME

(75) Inventors: Hui Huang, Guangdong (CN); Yusheng Hu, Guangdong (CN); Dongsuo Chen, Guangdong (CN); Huajie Chen, Guangdong (CN); Yong Xiao, Guangdong (CN); Xueying Zeng, Guangdong (CN); Wenming Zhang, Guangdong (CN)

(73) Assignees: Gree Electric Appliances, Inc. of Zhuhai, Zhuhai, Guangdong (CN); Gree Green Refrigeration Technology Center Co. Ltd. of Zhuhai, Zhuhai, Guangdong (CN)

( * ) Notice: Subject to any disclaimer, the term of this patent is extended or adjusted under 35 U.S.C. 154(b) by 374 days.

(21) Appl. No.: 14/235,600

(22) PCT Filed: Aug. 29, 2011

(86) PCT No.: PCT/CN2011/079062
§ 371 (c)(1),
(2), (4) Date: Jan. 28, 2014

(87) PCT Pub. No.: WO2013/020312
PCT Pub. Date: Feb. 14, 2013

(65) Prior Publication Data
US 2014/0167549 A1 Jun. 19, 2014

(30) Foreign Application Priority Data
Aug. 5, 2011 (CN) .......................... 2011 1 0224896

(51) Int. Cl.
*H02K 1/27* (2006.01)
*H02K 1/24* (2006.01)
(52) U.S. Cl.
CPC ............ *H02K 1/2766* (2013.01); *H02K 1/246* (2013.01); *H02K 2213/03* (2013.01)

(58) Field of Classification Search
CPC ........ H02K 1/32; H02K 21/12; H02K 21/14; H02K 29/03
USPC ........................... 310/156.53, 156.56–156.57
See application file for complete search history.

(56) References Cited

U.S. PATENT DOCUMENTS 4,358,697 A   11/1982   Liu et al.
4,924,130 A *  5/1990   Fratta .................. H02K 1/2766
                                                      310/156.53

(Continued)

FOREIGN PATENT DOCUMENTS

CN          1149778 A       5/1997
CN          1243351 A       2/2000

(Continued)

OTHER PUBLICATIONS

International Search Report issued by the State Intellectual Property Office of the P.R. China (Chinese language), dated Apr. 11, 2012, for related International Application No. PCT/CN2011/079062; 6 pages.

(Continued)

*Primary Examiner* — Tran Nguyen
(74) *Attorney, Agent, or Firm* — Faegre Baker Daniels LLP

(57) ABSTRACT

A motor rotor includes an iron core and a permanent magnet arranged inside the iron core, wherein, a plurality of groups of mounting grooves are arranged in the iron core in a circumferential direction of the iron core, and each group of mounting grooves comprises two or more than two mounting grooves arranged at intervals in a radial direction of the iron core; and a plurality of groups of permanent magnets are provided, and each permanent magnet in each group of permanent magnets is correspondingly embedded in the corresponding mounting groove of each group of mounting grooves. A motor having the motor rotor is further provided, and the magnetic reluctance torque of the motor rotor is increased, thereby increasing the output torque of the motor and the efficiency of the motor.

15 Claims, 5 Drawing Sheets

(56) References Cited

U.S. PATENT DOCUMENTS

| | | | |
|---|---|---|---|
| 5,818,140 A | 10/1998 | Vagati | |
| 5,903,080 A | 5/1999 | Nashiki | |
| 5,945,760 A * | 8/1999 | Honda | H02K 1/276 310/156.53 |
| 6,218,753 B1 | 4/2001 | Asano et al. | |
| 6,239,526 B1 | 5/2001 | Oh et al. | |
| 6,630,762 B2 | 10/2003 | Naito | |
| 6,703,744 B2 | 3/2004 | Yoshinaga et al. | |
| 6,815,859 B2 | 11/2004 | Sakuma et al. | |
| 6,836,045 B2 | 12/2004 | Murakami et al. | |
| 7,019,426 B2 | 3/2006 | Mori | |
| 7,902,710 B2 | 3/2011 | Han et al. | |
| 7,939,982 B2 | 5/2011 | Horst | |
| 7,981,359 B2 | 7/2011 | Masuzawa et al. | |
| 8,772,994 B2 | 7/2014 | Feng | |
| 2002/0089251 A1 | 7/2002 | Tajima et al. | |
| 2002/0153796 A1 | 10/2002 | Yoshinaga | |
| 2002/0175583 A1 | 11/2002 | Kikuchi | |
| 2003/0030343 A1 | 2/2003 | Naito | |
| 2003/0094875 A1 | 5/2003 | Sakuma | |
| 2005/0110355 A1* | 5/2005 | Sakuma | H02K 21/14 310/156.53 |
| 2006/0103254 A1 | 5/2006 | Horst | |
| 2006/0145561 A1 | 7/2006 | Sakuma | |
| 2007/0096579 A1 | 5/2007 | Aydin et al. | |
| 2010/0052455 A1 | 3/2010 | Feng | |
| 2010/0141076 A1 | 6/2010 | Blissenbach | |
| 2014/0152139 A1 | 6/2014 | Huang | |

FOREIGN PATENT DOCUMENTS

| | | | |
|---|---|---|---|
| CN | 1158741 | | 3/2001 |
| CN | 1388625 | | 1/2003 |
| CN | 1405948 | | 3/2003 |
| CN | 2560153 | | 7/2003 |
| CN | 1505239 | | 6/2004 |
| CN | 2681433 | | 2/2005 |
| CN | 101026318 | | 8/2007 |
| CN | 101304204 | | 11/2008 |
| CN | 101359847 | | 2/2009 |
| CN | 101488679 | | 7/2009 |
| CN | 101714805 | | 5/2010 |
| CN | 101777809 | | 7/2010 |
| CN | 102111051 | | 6/2011 |
| CN | 202142924 U | | 2/2012 |
| CN | 202142925 U | | 2/2012 |
| CN | 202142926 U | | 2/2012 |
| CN | 202145610 | | 2/2012 |
| CN | 202145611 | | 2/2012 |
| CN | 202260714 | | 5/2012 |
| CN | 102769365 | | 11/2012 |
| EP | 0746079 | | 12/1996 |
| EP | 1283581 | | 12/2003 |
| JP | 09233744 | | 9/1997 |
| JP | 09308198 | | 11/1997 |
| JP | 11275783 A * | 10/1999 | H02K 1/27 |
| JP | 2001178045 | | 6/2001 |
| JP | 2002272031 | | 9/2002 |
| JP | 2003264974 | | 9/2003 |
| JP | 2009044860 A | | 2/2009 |
| JP | 2010213553 | | 9/2010 |
| JP | 2010226784 | | 10/2010 |
| JP | 2011083066 A * | 4/2011 | H02K 1/27 |

OTHER PUBLICATIONS

International Search Report issued by the State Intellectual Property Office of the P.R. China (English language), dated Apr. 11, 2012, for related International Application No. PCT/CN2011/079062; 4 pages.

International Search Report issued by the State Intellectual Property Office of P.R. China (Chinese language), Nov. 24, 2011, for related International Application No. PCT/CN2011/079181; 3 pages.

English translation of the International Search Report issued by the State Intellectual Property Office of P.R. China, Nov. 24, 2011, for related International Application No. PCT/CN2011/079181; 3 pages.

International Preliminary Report on Patentability and Written Opinion issued by the State Intellectual Property Office of the P.R. China (English language), dated Jan. 28, 2014, for related International Application No. PCT/CN2011/079181; 6 pages.

Written Opinion issued by the State Intellectual Property Office of the P.R. China (Chinese language), dated Nov. 24, 2011, for related International Application No. PCT/CN2011/079181; 4 pages.

English translation of the Written Opinion issued by the State Intellectual Property Office of the P.R. China, dated Nov. 24, 2011, for related International Application No. PCT/CN2011/079181; 4 pages.

International Search Report (Chinese language) issued by the State Intellectual Property Office of the P.R. China, dated Mar. 28, 2012, for related International Application No. PCT/CN2011/079169; 5 pages.

English translation of the International Search Report issued by the State Intellectual Property Office of the P.R. China, dated Mar. 28, 2012, for related International Application No. PCT/CN2011/079169; 3 pages.

International Preliminary Report on Patentability and Written Opinion issued by the State Intellectual Property Office of the P.R. China, dated Feb. 11, 2014, for related International Application No. PCT/CN2011/079169; 6 pages.

Written Opinion (Chinese language) issued by the State Intellectual Property Office of the P.R. China, dated Apr. 26, 2012, for related International Application No. PCT/CN2011/079169; 5 pages.

English translation of the Written Opinion issued by the State Intellectual Property Office of the P.R. China, dated Apr. 26, 2012, for related International Application No. PCT/CN2011/079169; 6 pages.

International Preliminary Report on Patentability and Written Opinion issued by the State Intellectual Property Office of the P.R. China, dated Feb. 11, 2014, for related International Application No. PCT/CN2011/079062; 6 pages.

Written Opinion (Chinese language) issued by the State Intellectual Property Office of the P.R. China, dated May 17, 2012, for related International Application No. PCT/CN2011/079062; 5 pages.

English translation of the Written Opinion issued by the State Intellectual Property Office of the P.R. China, dated May 17, 2012, for related International Application No. PCT/CN2011/079062; 8 pages.

International Search Report issued by the State Intellectual Property Office of the P.R. China (Chinese language), dated Apr. 11, 2012, for related International Application No. PCT/CN2011/079059; 5 pages.

English translation of the International Search Report issued by the State Intellectual Property Office of the P.R. China, dated Apr. 11, 2012, for related International Application No. PCT/CN2011/079059; 4 pages.

International Preliminary Report on Patentability and Written Opinion issued by the State Intellectual Property Office of the P.R. China, dated Feb. 11, 2014, for related International Application No. PCT/CN2011/079059; 6 pages.

Written Opinion (Chinese language) issued by the State Intellectual Property Office of the P.R. China, dated May 3, 2012, for related International Application No. PCT/CN2011/079059; 5 pages.

English translation of the Written Opinion issued by the State Intellectual Property Office of the P.R. China, dated May 23, 2012, for related International Application No. PCT/CN2011/079059; 8 pages.

International Search Report (Chinese language) issued by the State Intellectual Property Office of the P.R. China, dated Apr. 4, 2012, for related International Application No. PCT/CN2011/079064; 5 pages.

English translation of the International Search Report issued by the State Intellectual Property Office of the P.R. China, dated Apr. 4, 2012, for related International Application No. PCT/CN2011/079064; 3 pages.

(56) References Cited

OTHER PUBLICATIONS

International Preliminary Report on Patentability and Written Opinion issued by the State Intellectual Property Office of the P.R. China (with English translation), dated Feb. 11, 2014, for related International Application No. PCT/CN2011/079064; 15 pgs.
Written Opinion issued by the State Intellectual Property Office of the P.R. China (Chinese language), dated May 10, 2014, for related International Application No. PCT/CN2011/079064; 5 pages.
English translation of the Written Opinion issued by the State Intellectual Property Office of the P.R. China, dated May 10, 2012, for related International Application No. PCT/CN2011/079064; 8 pages.
International Search Report issued by the State Intellectual Property Office of the P.R. China (Chinese language), dated Apr. 1, 2012, for related International Application No. PCT/CN2011/079060; 4 pages.
English translation of the International Search Report issued by the State Intellectual Property Office of the P.R. China, dated Apr. 1, 2012, for related International Application No. PCT/CN2011/079060; 2 pages.
International Preliminary Report on Patentability and Written Opinion issued by the State Intellectual Property Office of the P.R. China, dated Feb. 11, 2014, for related International Application No. PCT/CN2011/079060; 4 pages.
Written Opinion (Chinese language) issued by the State Intellectual Property Office of the P.R. China, dated May 10, 2012, for related International Application No. PCT/CN2011/079060; 3 pages.
English translation of the Written Opinion issued by the State Intellectual Property Office of the P.R. China, dated May 10, 2012, for related International Application No. PCT/CN2011/079060; 4 pages.
First Examination Report (Chinese language) issued by the State Intellectual Property Office of the People's Republic of China, dated Feb. 7, 2013, for Chinese Patent Application No. 201110212590.0 (English Summary attached), Publication No. CN 102769365A; available at the European Patent Register at https://register.epo.org; 6 pages.
English translation of the First Examination Report issued by the State Intellectual Property Office of the P.R. China, dated Feb. 7, 2013, for Chinese Patent Application No. 2011102123590.0, Publication No. CN 102769365A; available at the European Patent Register at https://register.epo.org; 5 pages.
Second Examination Report (Chinese language) issued by the State Intellectual Property Office of the P.R. of China, dated Apr. 2, 2013, for Chinese Patent Application No. 201110212590.0 (English Summary attached), Publication No. CN 102769365A; available at the European Patent Register at https://register.epo.org; 6 pages.
English translation of the Second Examination Report issued by the State Intellectual Property Office of the P.R. China, dated Apr. 2, 2013, for Chinese Patent Application No. 201110212590.0, Publication No. CN 102769365A; available at the European Patent Register at https://register.epo.org; 5 pages.
Third Examination Report (Chinese language) issued by the State Intellectual Property Office of the People's Republic of China, dated Jun. 20, 2013, for Chinese Patent Application No. 201110212590.0 (English summary attached), Publication No. CN 102769365A; available at the European Patent Register at https://register.epo.org; 5 pages.
English translation of the Third Examination Report issued by the State Intellectual Property Office of the P.R. China, dated Jun. 20, 2013, for Chinese Patent Application No. 201110212590.0, Publication No. CN 102769365A; available at the European Patent Register at https://register.epo.org; 6 pages.
Search Report issued by the State Intellectual Property Office of the P.R. China, dated Jan. 24, 2013, for Chinese Patent Application No. 201110212590.0; Publication No. CN 102769365A; available at the European Patent Register at https://register.epo.org; 2 pages.
Supplemental Search Report issued by the State Intellectual Property Office of the P.R. China, dated Mar. 25, 2013, for Chinese Patent Application No. 201110212590.0, Publication No. CN 102769365A; available at the European Patent Register at https://register.epo.org; 1 page.
Examination Report (Chinese language) issued by the State Intellectual Property Office of the P.R. China, dated Feb. 8, 2013, for Chinese Patent Application No. 201110223492.7, Publication No. CN 102790502A; available at the European Patent Register at https://register.epo.org; 4 pages.
English translation of the Examination Report issued by the State Intellectual Property Office of the P.R. China, dated Feb. 8, 2013, for Chinese Patent Application No. 201110223492.7, Publication No. CN 102790502A; available at the European Patent Register at https://register.epo.org; 5 pages.
Search Report issued by the State Intellectual Property Office of the P.R. China, dated Jan. 31, 2013, for Chinese Patent Application No. 201110223492.7, Publication No. CN 102790502A; available at the European Patent Register at https://register.epo.org; 1 page.
Supplemental Search Report issued by the State Intellectual Property Office of the P.R. China, dated Nov. 1, 2013, for Chinese Patent Application No. 201110223492.7, Publication No. CN 102790502A; available at the European Patent Register at https://register.epo.org; 1 page.
Examination Report (Chinese language) issued by the State Intellectual Property Office of the P.R. China, dated Feb. 1, 2013, for Chinese Patent Application No. 201110224896.8, Publication No. CN 102761183A; available at the European Patent Register at https://register.epo.org; 8 pages.
English translation of the Examination Report issued by the State Intellectual Property Office of the P.R. China, dated Feb. 1, 2013, for Chinese Patent Application No. 201110224896.8, Publication No. CN 102761183A; available at the European Patent Register at https://register.epo.org; 9 pages.
Search Report issued by the State Intellectual Property Office of the P.R. China, dated Jan. 23, 2013, for Chinese Patent Application No. 201110224896.8, Publication No. CN 102761183A; available at the European Patent Register at https://register.epo.org; 4 pages.
First Examination Report (Chinese language) issued by the State Intellectual Property Office of the P.R. China, dated Mar. 8, 2013, for Chinese Patent Application No. 201110224391.1, Publication No. CN 102801235A; available at the European Patent Register at https://register.epo.org; 5 pages.
English translation of the First Examination Report issued by the State Intellectual Property Office of the P.R. China, dated Mar. 8, 2013, for Chinese Patent Application No. 201110224391.1, Publication No. CN 102801235A; available at the European Patent Register at https://register.epo.org; 7 pages.
Second Examination Report (Chinese language) issued by the State Intellectual Property Office of the P.R. China, dated May 15, 2013, for Chinese Patent Application No. 201110224391.1, Publication No. CN 102801235A; available at the European Patent Register at https://register.epo.org; 4 pages.
English translation of the Second Examination Report issued by the State Intellectual Property Office of the P.R. China, dated May 15, 2013, for Chinese Patent Application No. 201110224391.1, Publication No. CN 102801235A; available at the European Patent Register at https://register.epo.org; 5 pages.
Search Report issued by the State Intellectual Property Office of the P.R. China, dated Feb. 28, 2013, for Chinese Patent Application No. 201110224391.1, Publication No. CN 102801235A; available at the European Patent Register at https://register.epo.org; 1 page.
First Examination Report (Chinese language) issued by the State Intellectual Property Office of the P.R. China, dated Feb. 16, 2013, for Chinese Patent Application No. 201110224882.6 (English Summary attached), Publication No. CN 102780291A; available at the European Patent Register at https://register.epo.org; 8 pages.
English translation of the First Examination Report issued by the State Intellectual Property Office of the P.R. China, dated Feb. 16, 2013, for Chinese Patent Application No. 201110224882.6, Publication No. CN 102780291A; available at the European Patent Register at https://register.epo.org; 8 pages.

(56) References Cited

OTHER PUBLICATIONS

Second Examination Report (Chinese language) issued by the State Intellectual Property Office of the P.R. China, dated Apr. 18, 2013, for Chinese Patent Application No. 201110224882.6, Publication No. CN 102780291A; available at the European Patent Register at https://register.epo.org; 6 pages.

English translation of the Second Examination Report issued by the State Intellectual Property Office of the P.R. China, dated Apr. 18, 2013, for Chinese Patent Application No. 201110224882.6, Publication No. CN 102780291A; available at the European Patent Register at https://register.epo.org; 7 pages.

Search Report issued by the State Intellectual Property Office of the P.R. China, dated Feb. 1, 2013, for Chinese Patent Application No. 201110224882.6, Publication No. CN 102780291A; available at the European Patent Register at https://register.epo.org; 2 pages.

Supplemental Search Report issued by the State Intellectual Property Office of the P.R. China, dated Apr. 10, 2013, for Chinese Patent Application No. 201110224882.6, Publication No. CN 102780291A; available at the European Patent Register at https://register.epo.org; 1 page.

Examination Report (Chinese language) issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.

English translation of the Examination Report issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.

Search Report issued by the State Intellectual Property Office of the P.R. China, dated Dec. 25, 2012, for Chinese Patent Application No. 201110224395.X, Publication No. CN 102761182A; available at the European Patent Register at https://register.epo.org; 1 page.

* cited by examiner

MOTOR ROTOR AND MOTOR HAVING SAME

CROSS-REFERENCE TO RELATED APPLICATIONS

This application is a National Stage application of PCT international application PCT/CN2011/079062, filed on Aug. 29, 2011 which claims the priority to Chinese Patent Application No. 201110224896.8, entitled "MOTOR ROTOR AND MOTOR HAVING SAME", filed with the Chinese Patent Office on Aug. 5, 2011, both of which are incorporated herein by reference in their entirety.

TECHNICAL FIELD

The present application relates to the field of motors, and particularly to a motor rotor and a motor having the same.

BACKGROUND

An interior permanent magnet synchronous motor (IPM) is a motor having a layer of permanent magnet placed inside a rotor and primarily utilizing permanent magnet torque and utilizing auxiliary reluctance torque.

Resultant formula of the reluctance torque and the permanent magnet torque is as follows:

$$T = mp(L_q - L_d) i_d i_q + mp \Psi_{PM} i_q.$$

Wherein, T is an output torque of a motor, the performance of the motor can be improved by increasing the value of T; the first item in the equation following T is the reluctance torque, and the second item is the permanent magnet torque; $\Psi_{PM}$ is the maximum value of stator-rotor coupling magnetic flux generated by a permanent magnet of the motor, m is a phase number of a conductor of a stator, $L_d$ and $L_q$ are inductances along axis d and axis q respectively, wherein axis d refers to an axis coincided with an axis of the main magnetic pole, and axis q refers to an axis perpendicular to the axis of the main magnetic pole, the perpendicular relationship refers to perpendicularity of electrical angles, and $i_d$ and $i_q$ are components of an armature current in the directions of axis d and axis q respectively.

In the prior art, the performance of the motor is generally improved by improving the performance of the permanent magnet, that is, by increasing the permanent magnet torque to increase the value of the resultant torque so as to improve the efficiency of the motor, and the common method is to use rare-earth permanent magnets. However, since rare earth is a non-renewable resource and is expensive, the widespread use of this kind of motor is restricted. Additionally, the urgent demand of further improving the motor efficiency can not be met by only improving the performance of the permanent magnet.

SUMMARY

The present application provides a motor rotor which can improve the motor efficiency by increasing a reluctance torque and reduces the usage of rare-earth permanent magnets, and a motor having the motor rotor.

According to an aspect of the present application, a motor rotor is provided, which includes an iron core and a permanent magnet arranged inside the iron core, wherein a plurality of groups of mounting grooves are arranged in the iron core in a circumferential direction of the iron core, and each group of mounting grooves includes two or more than two mounting grooves arranged at intervals in a radial direction of the iron core; and a plurality of groups of permanent magnets are provided, and each permanent magnet in each group of permanent magnets is correspondingly embedded in the corresponding mounting groove of each group of mounting grooves.

Further, each group of mounting grooves includes a first mounting groove and a second mounting groove, and permanent magnets embedded in the first mounting groove and the second mounting groove are respectively a first permanent magnet and a second permanent magnet, and in each group of permanent magnets, a sum of thicknesses, in a direction of a symmetrical line of the permanent magnet, of all of the permanent magnets is T, and a sum of distances, in the direction of the symmetrical line of the permanent magnet, between adjacent permanent magnets (20) is g, and a ratio of g to T meets an expression of $$\frac{1}{5} \le \frac{g}{T} \le \frac{4}{5}.$$

Further, each group of mounting grooves includes a first mounting groove, a second mounting groove and a third mounting groove, and permanent magnets embedded in the first mounting groove, the second mounting groove and the third mounting groove are respectively a first permanent magnet, a second permanent magnet and a third permanent magnet, and in each group of permanent magnets, a sum of thicknesses, in a direction of a symmetrical line of the permanent magnet, of all of the permanent magnets is T, and a sum of distances, in the direction of the symmetrical line of the permanent magnet, between adjacent permanent magnets is g, and a ratio of g to T meets an expression of $$\frac{2}{5} \le \frac{g}{T} \le 1.$$

Further, clearances are respectively provided between two ends of each permanent magnet and two ends of the mounting groove in which the permanent magnet is embedded.

Further, the clearances between the two ends of the permanent magnet and the two ends of the mounting groove are filled with non-magnetically permeable media.

Further, on a cross section, in a direction perpendicular to an axis of the rotor, of the permanent magnet, a middle portion of the permanent magnet has a thickness greater than two ends of the permanent magnet.

Further, the cross section, in the direction perpendicular to the axis of the rotor, of the permanent magnet is of a rectangular shape.

Further, a cross section, in the direction perpendicular to the axis of the rotor, of the mounting groove is of a U shape.

Further, each group of permanent magnets includes a permanent magnet having an arc-shaped cross section in the direction perpendicular to the axis of the rotor.

Further, a surface, close to a center of the rotor in a radial direction of the rotor, of each permanent magnet in each group of permanent magnets is an arc-shaped surface.

Further, each permanent magnet in each group of permanent magnets is a permanent magnet having an arc-shaped cross section.

Further, in each group of permanent magnets, a surface, away from a center of the rotor, of the permanent magnet located at the outermost side in the radial direction of the rotor is a plane, and a surface, close to the center of the rotor, thereof is an arc-shaped surface.

Further, in each group of permanent magnets, each permanent magnet has an arc-shaped surface protruding towards a center of the rotor.

Further, in each group of permanent magnets, the closer an arc-shaped surface in arc-shaped surfaces of each permanent magnet to a center of the rotor, the larger a radian of the arc-shaped surface.

According to one aspect of the present application, a motor is further provided, which includes the above motor rotor.

According to the motor rotor and the motor having the same provided by the present application, a plurality of groups of mounting grooves are arranged in the iron core in a circumferential direction of the iron core, and each group of mounting grooves includes two or more than two mounting grooves arranged at intervals in a radial direction of the iron core; and each permanent magnet in a plurality of groups of permanent magnets is correspondingly embedded in the corresponding mounting groove of each group of mounting grooves. Since multiple layers of permanent magnets are placed in the direction of axis d, and the permanent magnet has a relatively high magnetic reluctance and has a magnetic permeability approximately equal to air, an inductance $L_d$ in the direction of axis d is relatively low, however, in the direction of axis q, the iron core has a relatively high magnetic permeability, thus an inductance $L_q$ in the direction of axis q is relatively high, which increases the magnetic reluctance torque of the motor rotor, and in turn improves the efficiency of the motor without using the method of increasing the rare-earth permanent magnets, thereby reducing the usage of the rare earth.

BRIEF DESCRIPTION OF THE DRAWINGS

The accompanying drawings constituting a part of the present application are provided to help further understanding the present application, and the illustrative embodiments and the description thereof are used to interpret the present application and do not constitute inappropriate limitations to the present application.

DETAILED DESCRIPTION

The present application is described in detail hereinafter in conjunction with drawings and embodiments.

Figure 1:
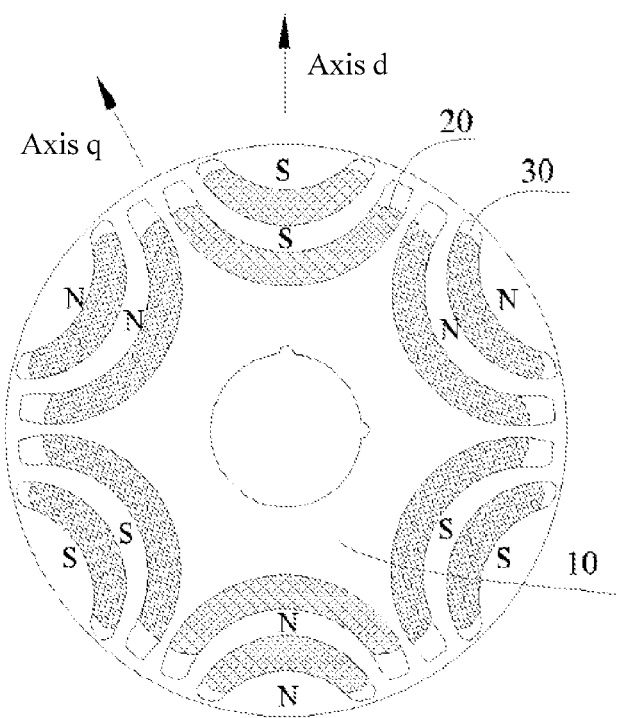
FIG. 1 is a schematic view showing the structure of a motor rotor according to a first embodiment of the present application.

A motor rotor according to a first embodiment of the present application as shown in FIG. 1 includes an iron core 10 and a permanent magnet 20 arranged inside the iron core 10. Multiple groups of mounting grooves 30 are arranged in the iron core 10 along the circumferential direction of the iron core 10, and each group of mounting grooves 30 includes two or more than two mounting grooves 30 arranged at intervals in the radial direction of the iron core 10. There are multiple groups of permanent magnets 20, and permanent magnets 20 in each group of permanent magnets 20 are correspondingly embedded into corresponding mounting grooves 30 in each group of mounting grooves 30.

The iron core 10 of the motor rotor in FIG. 1 is formed by laminated silicon steel sheets and has a certain height, six groups of mounting grooves 30 are uniformly distributed in the circumferential direction of the iron core 10 taking the axes of the iron core 10 as a center, and each group of mounting grooves 30 includes two layers of arc-shaped mounting grooves 30. Axis d and axis q of the motor rotor are shown in Figures, and the dimensions of the mounting grooves 30 are gradually reduced in the direction of axis d. When placing permanent magnets 20 into the mounting grooves 30, it requires that the permanent magnets 20 in the same group have the same polarity in a direction toward the outer circumference of the motor rotor, for example, as shown in FIG. 1, two layers of permanent magnets in the direction of axis d both show S polarity; and at the same time, it also requires that two adjacent groups of permanent magnets 20 show opposite polarities, thus the six groups of permanent magnets 20 are distributed to show N polarity and S polarity alternately in the direction toward the outer circumference of the motor rotor. Since multiple layers of permanent magnets 20 are placed in the direction of axis d, and the permanent magnet 20 has a relatively high magnetic reluctance and has a magnetic permeability approximately equal to air, an inductance $L_d$ in the direction of axis d is relatively low, however, in the direction of axis q, the iron core 10 has a relatively high magnetic permeability, thus an inductance $L_q$ in the direction of axis q is relatively high, thereby increasing the magnetic reluctance torque of the motor rotor, and in turn increasing the output torque of the motor and improving the efficiency of the motor. Such an approach for improving the efficiency of the motor may substitute the method of improving the efficiency of the motor by increasing the rare-earth permanent magnets, thereby reducing the usage of the rare earth, which on one hand, saves energy and mitigates the environment burden, and at the other hand, reduces the cost and improves the product competitiveness.

In this embodiment, as shown in FIG. 1, there are clearances between two ends of each permanent magnet 20 and two ends of the mounting groove 30 in which the permanent magnet 20 is embedded. Preferably, the clearances between the two ends of the permanent magnet 20 and the two ends of the mounting groove 30 are filled with non-magnetically permeable media.

As shown in FIG. 1, each group of permanent magnets 20 includes a permanent magnet 20 having an arc-shaped cross section in a direction perpendicular to the axis of the rotor, and a surface, close to the center of the rotor in the radial direction of the rotor, of each permanent magnet 20 in each group of permanent magnets 20 is of an arc shape. In this embodiment, each permanent magnet 20 in each group of permanent magnets 20 has an arc-shaped cross section, that is, each permanent magnet 20 is of an arc shape with same thickness. The arc-shaped permanent magnet 20 is slightly shorter than the mounting groove 30, thus there are clearances at both ends of the permanent magnet 20 after the permanent magnet 20 is inserted into the mounting groove 30, and air or other non-magnetically permeable media may be filled in the clearances.

Figure 4:
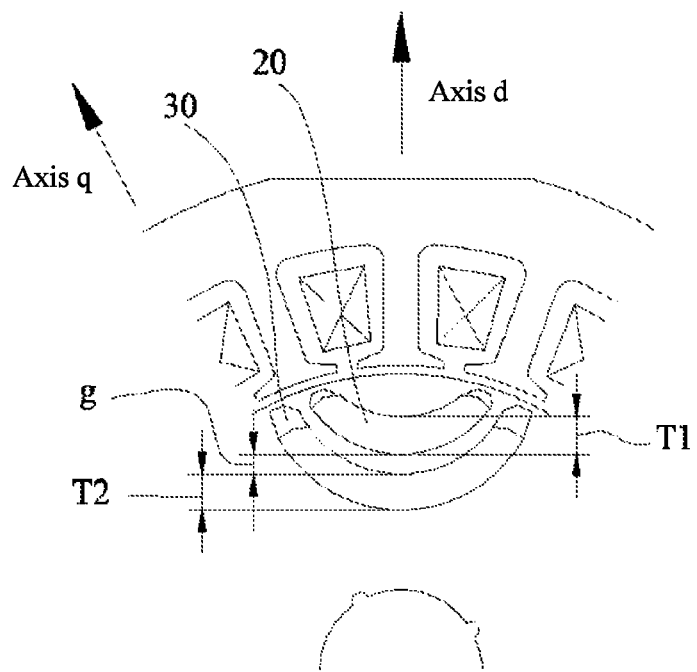
FIG. 4 is a schematic view showing a thickness of a permanent magnet and a distance between permanent magnets of the motor rotor according to the first embodiment of the present application.

As shown in FIG. 4, in the first embodiment of the motor rotor, each group of mounting grooves 30 includes a first mounting groove away from the center of the rotor and a second mounting groove close to the center of the rotor. The permanent magnets 20 embedded in the first mounting groove and the second mounting groove are respectively a first permanent magnet and a second permanent magnet. In each group of permanent magnets 20, a sum of thicknesses, in the direction of the symmetric line of the permanent magnets 20, of all of the permanent magnets 20 is T, and a sum of distances, in the direction of the symmetric line of the permanent magnets 20, between adjacent permanent magnets 20 is g, and $$\frac{1}{5} \leq \frac{g}{T} \leq \frac{4}{5}.$$

Figure 8:
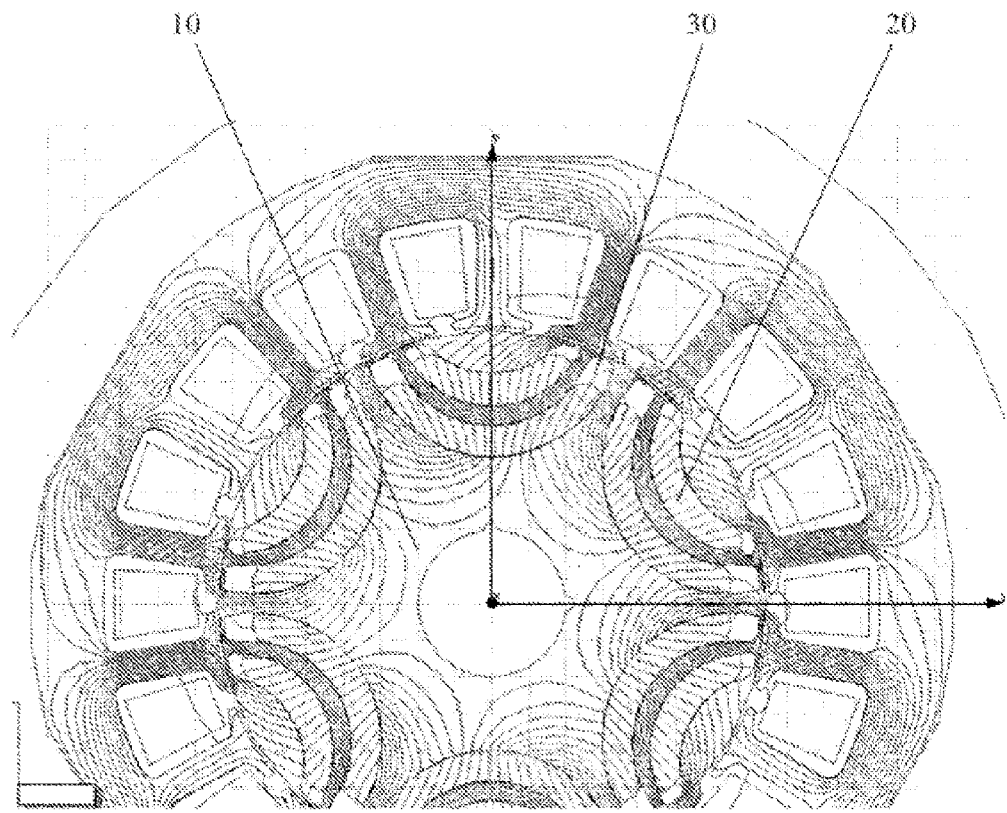
FIG. 8 is a schematic view showing the distribution of magnetic flux according to the first embodiment of the present application.

As shown in FIG. 8, when the values of g and T meet the above formula, magnetic flux is densely distributed in the channel between two adjacent layers of magnetic steels, thereby effectively utilizing the magnetic path along the axis q, and increasing the output torque of the motor.

On a cross section of the rotor in the axial direction, the longest sides of the first permanent magnet and the second permanent magnet are respectively the first longest side and the second longest side, a distance between intersection points at which a perpendicular bisector of a connecting line, connecting the geometry center of the first longest side to any point on the first longest side, intersects the first longest side and the opposite side thereof is a thickness of the first permanent magnet, and a distance between intersection points at which a perpendicular bisector of a connecting line, connecting the geometry center of the second longest side to any point on the second longest side, intersects the second longest side and the opposite side thereof is a thickness of the second permanent magnet. A distance between intersection points at which a perpendicular bisector of a connecting line, connecting the geometry center of the longer side in the two opposite sides of the first permanent magnet and the second permanent magnet to any point on the longer side, intersects with two opposite sides of the first permanent magnet and the second permanent magnet is a distance between the first permanent magnet and the second permanent magnet. The maximum thicknesses of the first permanent magnet and the second permanent magnet are respectively T1 and T2, and the maximum distance between the first permanent magnet and the second permanent magnet is g1.

In this embodiment, the maximum thickness of each permanent magnet 20 is the thickness in the direction of the symmetrical line of the permanent magnet 20, and T=T1+T2. Since there are two permanent magnets 20 in each group of the permanent magnets 20 in this embodiment, the maximum distance g1 between the first permanent magnet and the second permanent magnet equals to a sum g of distances between adjacent permanent magnets 20 in the direction of the symmetrical line of the permanent magnets 20, that is, g=g1.

Figure 6:
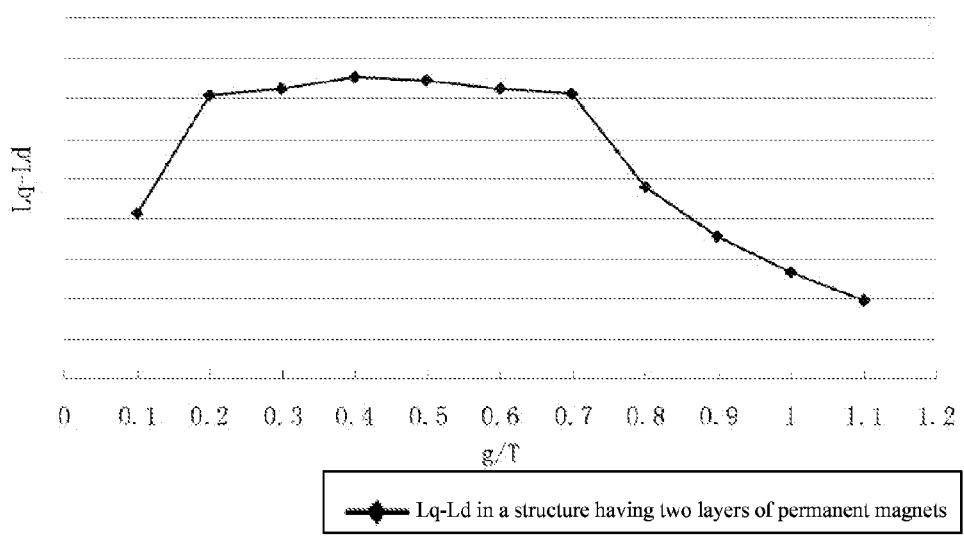
FIG. 6 is a schematic view showing the relationship among a difference of inductances along axis d and axis q, the thickness of the permanent magnet, and the distance between the permanent magnets of the motor rotor according to the first embodiment of the present application.

The relationship among the difference of inductances along the axis d and axis q, the thickness of the permanent magnet, and the distance between the permanent magnets in the first embodiment of the motor rotor is obtained based on test data of an experiment and shown in FIG. 6. When a ratio of g to T meets a relationship of $$\frac{1}{5} \leq \frac{g}{T} \leq \frac{4}{5},$$

a larger value of $L_d - L_g$ may be acquired, which increases the output torque of the motor and improves the efficiency of the motor.

Preferably, the ratio of g to T meets a relationship of $$\frac{1}{5} \leq \frac{g}{T} \leq \frac{7}{10}.$$

Figure 2:
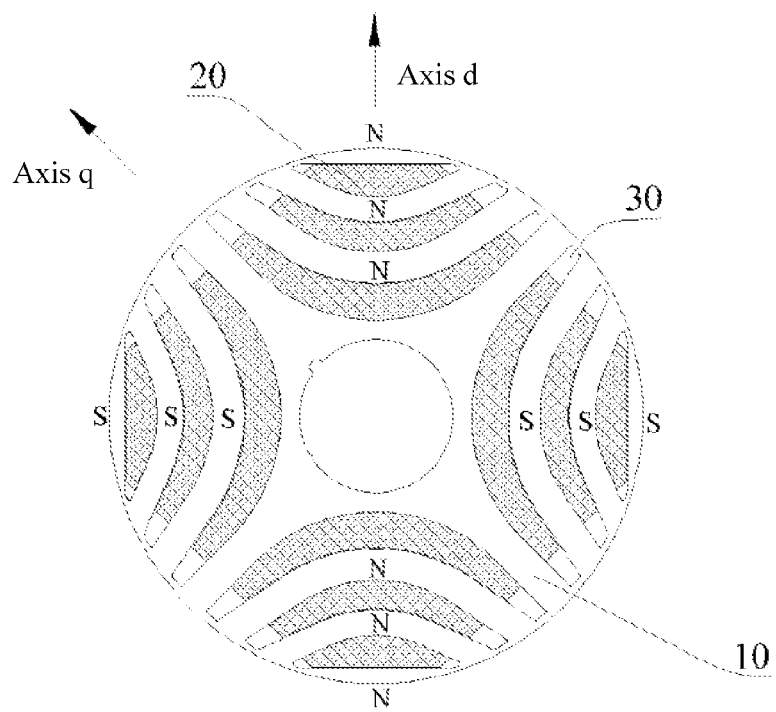
FIG. 2 is a schematic view showing the structure of a motor rotor according to a second embodiment of the present application.

In a motor rotor according to a second embodiment of the present application shown in FIG. 2, four groups of mounting grooves 30 are uniformly distributed in the circumferential direction of the iron core 10 taking the axes of the iron core 10 as the center, and each group of mounting grooves 30 includes three layers of arc-shaped mounting grooves 30.

In each group of permanent magnets 20, a surface, away from the center of the rotor, of the permanent magnet 20 located at the outermost side in the radial direction of the rotor is a plane, and a surface, close to the center of the rotor, thereof is an arc-shaped surface, and a surface, close to the center of the rotor, and a surface, away from the center of the rotor, of each of the rest permanent magnets 20 are both an arc-shaped surface. In each group of permanent magnets 20, the arc-shaped surface of each permanent magnet 20 protrudes towards the center of the rotor. In each group of permanent magnets 20, the closer the arc-shaped surface in the arc-shaped surfaces of the permanent magnet to the center of the rotor, the larger the radian of the arc-shaped surface. Therefore, in this embodiment, on the cross section in the direction perpendicular to the axis of the rotor, a middle portion of the permanent magnet 20 has a thickness greater than both ends of the permanent magnet 20, that is, the permanent magnet 20 is of an arc shape with gradually varied thickness which is gradually reduced from the center to two ends.

Figure 3:
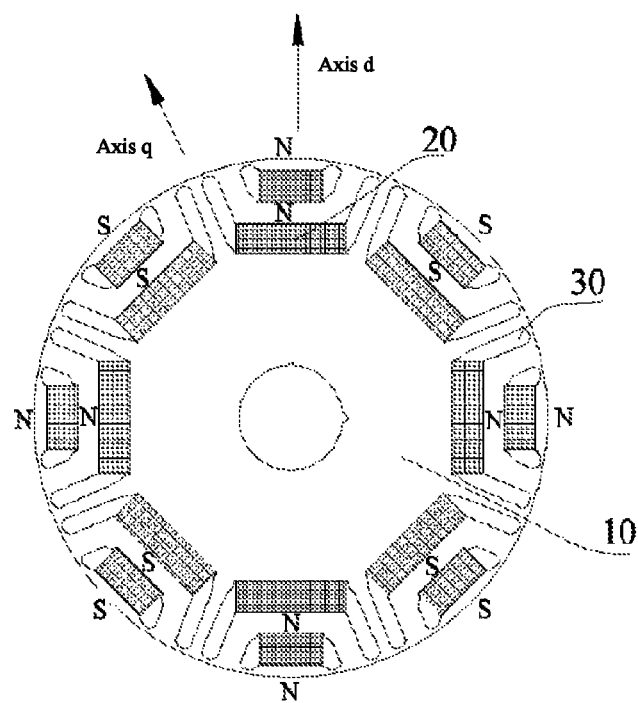
FIG. 3 is a schematic view showing the structure of a motor rotor according to a third embodiment of the present application.

In a motor rotor according to a third embodiment of the present application shown in FIG. 3, eight groups of mounting grooves 30 are uniformly distributed in the circumferential direction of the iron core 10 taking the axes of the iron core 10 as the center, and each group of mounting grooves 30 includes two layers of rectangular-shaped mounting grooves 30.

A cross section, perpendicular to the axis of the rotor, of the permanent magnet 20 is of a rectangular shape, and on this cross section, the middle portion of the permanent magnet 20 has a thickness equal to two ends thereof. A cross section, in the direction perpendicular to the axis of the rotor, of the mounting groove 30 is of a U shape. A clearance between the permanent magnet 20 close to the center of the rotor and the mounting groove 30 in which the permanent magnet 20 is located is greater than a clearance between the permanent magnet 20 away from the center of the rotor and the mounting groove 30 in which the permanent magnet 20 is located.

The shaping of the arc-shaped permanent magnet is greatly affected by the material, and there are many fine processing procedures in the later stage of the shaping, however, the shaping and processing procedures of the rectangular-shaped permanent magnet are relatively simple, thus using the rectangular-shaped permanent magnet may improve the production efficiency and interchangeability. The first layer of the permanent magnets and the second layer of the permanent magnets in the rotor are interchangeable, thus using the square-shaped permanent magnet may reduce the production cost, and further due to the U-shaped structure in this design, there are clearances at both sides of the magnetic steel, thus square-shaped permanent magnets of various dimensions may be inserted in the clearances to adjust the performance of the motor without replacing with a rotor with new groove type, thereby realizing the interchangeability of the structure of the rotor.

Figure 5:
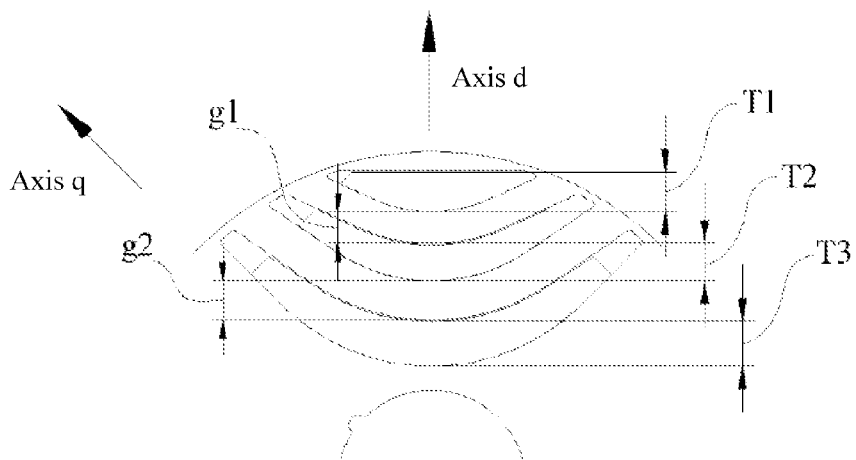
FIG. 5 is a schematic view showing a thickness of a permanent magnet and a distance between permanent magnets of the motor rotor according to the second embodiment of the present application.

As shown in FIG. 5, in the motor rotor according to the second embodiment, each group of mounting grooves 30 includes a first mounting groove, a second mounting groove and a third mounting groove distributed in sequence from a position away from the center of the rotor to a position close to the center of the rotor, and the permanent magnets 20 embedded in the first mounting groove, the second mounting groove and the third mounting groove are respectively a first permanent magnet, a second permanent magnet and a third permanent magnet. In each group of permanent magnets 20, a sum of thicknesses of all of the permanent magnets 20 in the direction of the symmetrical line of the permanent magnet 20 is T, and a sum of the distances between adjacent permanent magnets 20 in the direction of the symmetrical line of the permanent magnet 20 is g, and a ratio of g to T meets the expression of $$\frac{2}{5} \le \frac{g}{T} \le 1.$$

In the radial direction of the cross section of the rotor, the longest sides of the first permanent magnet, the second permanent magnet and the third permanent magnet are respectively the first longest side, the second longest side and the third longest side. A distance between intersection points at which a perpendicular bisector of a connecting line, connecting the geometry center of the first longest side to any point on the first longest side, intersects the first longest side and the opposite side thereof is a thickness of the first permanent magnet, a distance between intersection points at which a perpendicular bisector of a connecting line, connecting the geometry center of the second longest side to any point on the second longest side, intersects the second longest side and the opposite side thereof, is a thickness of the second permanent magnet, and a distance between intersection points at which a perpendicular bisector of a connecting line, connecting the geometry center of the third longest side to any point on the third longest side, intersects the third longest side and the opposite side thereof is a thickness of the third permanent magnet. A distance between intersection points at which a perpendicular bisector of a connecting line, connecting the geometry center of the longer side in two opposite sides of the first permanent magnet and the second permanent magnet to any point on the longer side, intersects two opposite sides of the first permanent magnet and the second permanent magnet is a distance between the first permanent magnet and the second permanent magnet, and a distance between intersection points at which a perpendicular bisector of a connecting line, connecting the geometry center of the longer side in two opposite sides of the second permanent magnet and the third permanent magnet to any point on the longer side, intersects two opposite sides of the second permanent magnet and the third permanent magnet is a distance between the second permanent magnet and the third permanent magnet.

The maximum thicknesses of the first permanent magnet, the second permanent magnet and the third permanent magnet are respectively T1, T2 and T3, and the maximum distance between the first permanent magnet and the second permanent magnet is g1, and the maximum distance between the second permanent magnet and the third permanent magnet is g2. As shown in FIG. 5, in this embodiment, the maximum thickness of each permanent magnet 20 is the thickness in the direction of the symmetrical line of the permanent magnet 20, that is, a sum of the maximum thicknesses of the permanent magnets 20 in each group of mounting grooves 30 is T, and T=T1+T2+T3; and the maximum distance between two adjacent permanent magnets 20 is the distance in the direction of the symmetrical line of the permanent magnets 20, and g=g1+g2.

Figure 7:
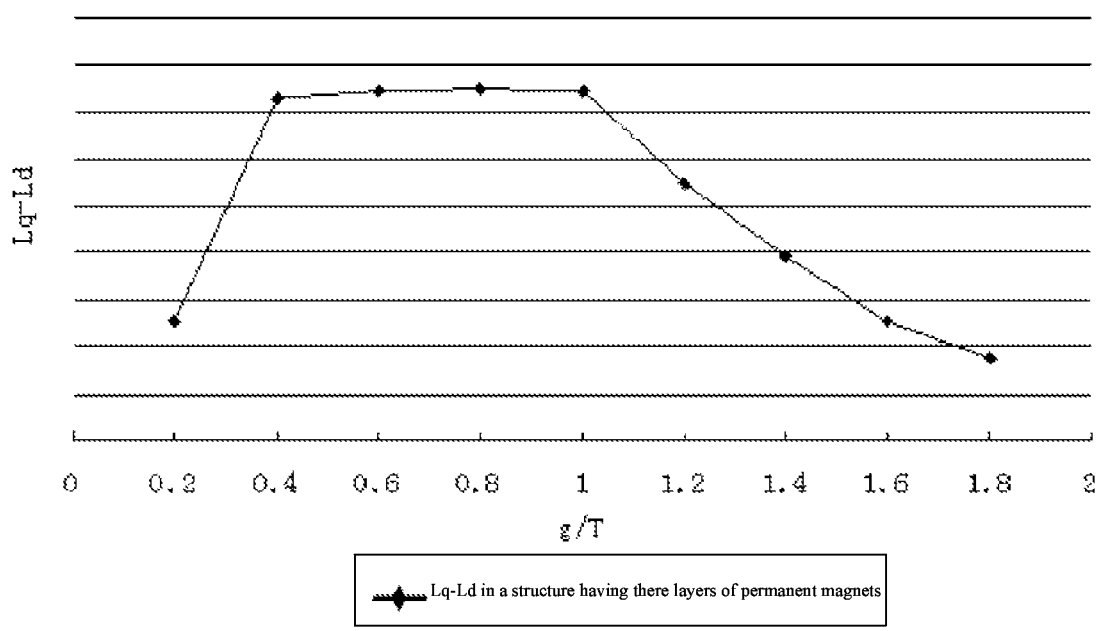
FIG. 7 is a schematic view showing the relationship among a difference of inductances along axis d and axis q, the thickness of the permanent magnet, and the distance between the permanent magnets of the motor rotor according to the second embodiment of the present application.

The relationship among the difference of inductances along axis d and axis q, the thickness of the permanent magnet, and the distance between the permanent magnets of the motor rotor according to the second embodiment of the present application is shown in FIG. 7. When a ratio of g to T meets an expression of $$\frac{2}{5} \le \frac{g}{T} \le 1,$$

a large value of $L_d-L_q$ may be acquired, which increases the output torque of the motor and improves the efficiency of the motor.

The present application further provides a motor including the above motor rotor.

In the motor provided by the present application, the utilization of the reluctance torque is increased by defining the relationship between the thickness of the permanent magnet and the distance between the permanent magnets, thereby improving the efficiency of the motor. The motor provided by the present application may be used in air condition compressors, electric vehicles, and fan systems.

Based on the above description, the embodiments of the present application have the following technical effects.

In the motor rotor and the motor having the same provided by the present application, the reluctance torque of the motor rotor is increased, therefore the output torque of the motor is increased and the motor efficiency is improved. This method for improving the motor efficiency may substitute the method of improving the motor efficiency by increasing the rare-earth permanent magnets, thereby reducing the usage of the rare earth, which on one hand, saves energy and mitigates the environment burden, and at the other hand, reduces the cost and improves the product competitiveness.

The embodiments described hereinabove are only preferred embodiments of the present application, and should not be interpreted as limitation to the present application. For the persons skilled in the art, various variations and modifications may be made to the present application. Any modifications, equivalent replacements and improvements made within the spirit and principle of the present application are also deemed to fall into the protection scope of the present application.

The invention claimed is:

1. A motor rotor, comprising an iron core and a permanent magnet arranged inside the iron core, wherein,
a plurality of groups of mounting grooves are arranged in the iron core in a circumferential direction of the iron core, and each group of mounting grooves comprises two or more than two mounting grooves arranged at intervals in a radial direction of the iron core; and
a plurality of groups of permanent magnets are provided, and each permanent magnet in each group of permanent magnets is correspondingly embedded in the corresponding mounting groove of each group of mounting grooves,
wherein each group of mounting grooves comprises a first mounting groove, a second mounting groove and a third mounting groove, and permanent magnets embedded in the first mounting groove, the second mounting groove and the third mounting groove are respectively a first permanent magnet, a second permanent magnet and a third permanent magnet, and in each group of permanent magnets, a sum of thicknesses, in a direction of a symmetrical line of the permanent magnet, of all of the permanent magnets is T, and a sum of distances, in the direction of the symmetrical line of the permanent magnet, between adjacent permanent magnets is g, and a ratio of g to T meets an expression of $$\frac{2}{5} \le \frac{g}{T} \le 1.$$

2. The motor rotor according to claim 1, wherein clearances are respectively provided between two ends of each permanent magnet and two ends of the mounting groove in which the permanent magnet is embedded.

3. The motor rotor according to claim 2, wherein the clearances between the two ends of the permanent magnet and the two ends of the mounting groove are filled with non-magnetically permeable media.

4. The motor rotor according to claim 1, wherein on a cross section, in a direction perpendicular to an axis of the rotor, of the permanent magnet, a middle portion of the permanent magnet has a thickness greater than two ends of the permanent magnet.

5. The motor rotor according to claim 1, wherein the cross section, in the direction perpendicular to the axis of the rotor, of the permanent magnet is of a rectangular shape.

6. The motor rotor according to claim 5, wherein a cross section, in the direction perpendicular to the axis of the rotor, of the mounting groove is of a U shape.

7. The motor rotor according to claim 4, wherein each group of permanent magnets comprises a permanent magnet having an arc-shaped cross section in the direction perpendicular to the axis of the rotor.

8. The motor rotor according to claim 7, wherein a surface, close to a center of the rotor in a radial direction of the rotor, of each permanent magnet in each group of permanent magnets is an arc-shaped surface.

9. The motor rotor according to claim 7, wherein each permanent magnet in each group of permanent magnets is a permanent magnet having an arc-shaped cross section.

10. The motor rotor according to claim 7, wherein in each group of permanent magnets, a surface, away from a center of the rotor, of the permanent magnet located at the outermost side in the radial direction of the rotor is a plane, and a surface, close to the center of the rotor, thereof is an arc-shaped surface.

11. The motor rotor according to claim 7, wherein in each group of permanent magnets, each permanent magnet has an arc-shaped surface protruding towards a center of the rotor.

12. The motor rotor according to claim 7, wherein in each group of permanent magnets, the closer an arc-shaped surface in arc-shaped surfaces of each permanent magnet to a center of the rotor, the larger a radian of the arc-shaped surface.

13. A motor, comprising a motor rotor, wherein the motor rotor comprises an iron core and a permanent magnet arranged inside the iron core, a plurality of groups of mounting grooves are arranged in the iron core in a circumferential direction of the iron core, and each group of mounting grooves comprises two or more than two mounting grooves arranged at intervals in a radial direction of the iron core; and a plurality of groups of permanent magnets are provided, and each permanent magnet in each group of permanent magnets is correspondingly embedded in the corresponding mounting groove of each group of mounting grooves, and wherein each group of mounting grooves comprises a first mounting groove, a second mounting groove and a third mounting groove, and permanent magnets embedded in the first mounting groove, the second mounting groove and the third mounting groove are respectively a first permanent magnet, a second permanent magnet and a third permanent magnet, and in each group of permanent magnets, a sum of thicknesses, in a direction of a symmetrical line of the permanent magnet, of all of the permanent magnets is T, and a sum of distances, in the direction of the symmetrical line of the permanent magnet, between adjacent permanent magnets is g, and a ratio of g to T meets an expression of $$\frac{2}{5} \le \frac{g}{T} \le 1.$$

14. The motor rotor according to claim 1, wherein clearances are respectively provided between two ends of each permanent magnet and two ends of the mounting groove in which the permanent magnet is embedded.

15. The motor rotor according to claim 1, wherein on a cross section, in a direction perpendicular to an axis of the rotor, of the permanent magnet, a middle portion of the permanent magnet has a thickness greater than two ends of the permanent magnet.

* * * * *